G. A. OERTZEN.
MOLDING MACHINE.
APPLICATION FILED JUNE 4, 1908.

906,268.

Patented Dec. 8, 1908.

3 SHEETS—SHEET 1.

G. A. OERTZEN.
MOLDING MACHINE.
APPLICATION FILED JUNE 4, 1908.
906,268.
Patented Dec. 8, 1908.
3 SHEETS—SHEET 2.
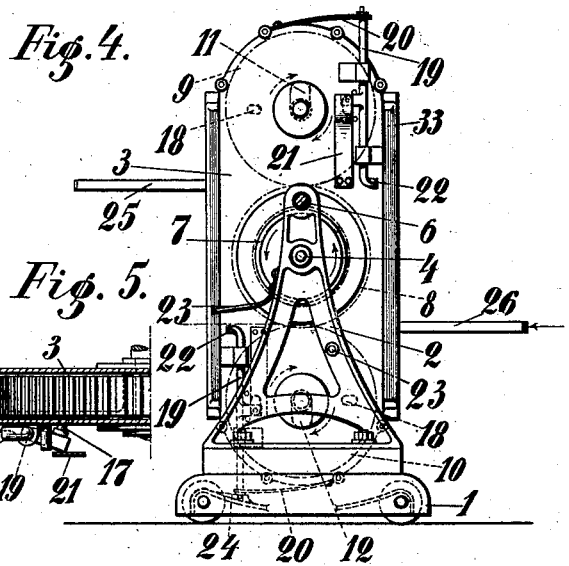
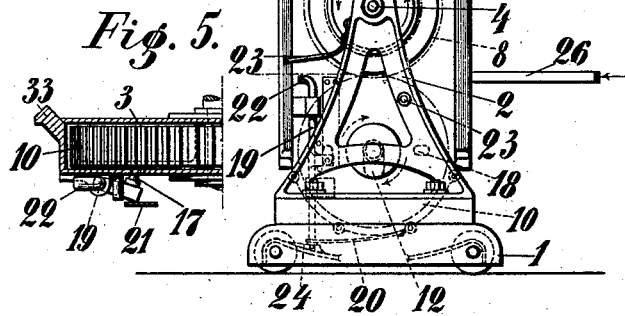
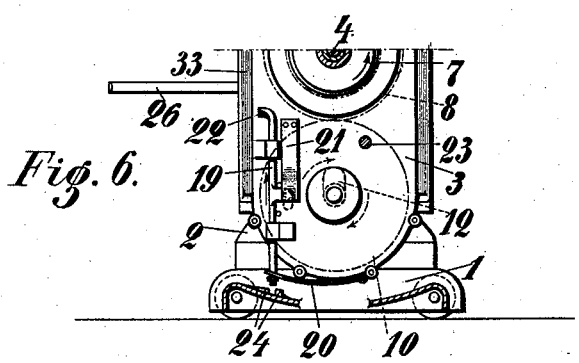
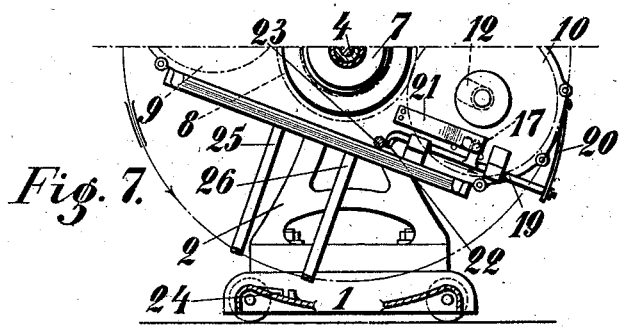

G. A. OERTZEN.
MOLDING MACHINE.
APPLICATION FILED JUNE 4, 1908.
906,268.
Patented Dec. 8, 1908.
3 SHEETS—SHEET 3.
Fig. 8.   Fig. 9.   Fig. 10.
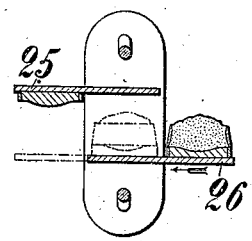
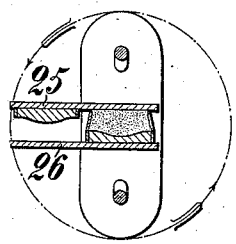
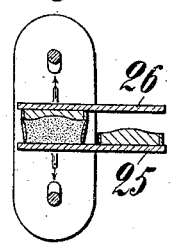
Fig. 11.   Fig. 12.   Fig. 13.
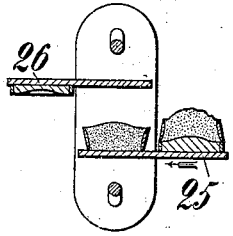
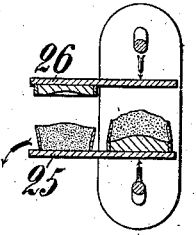
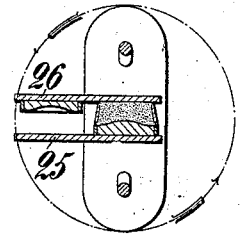
Fig. 14.   Fig. 15.   Fig. 16.
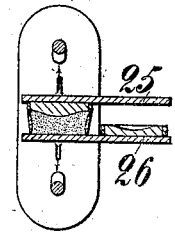
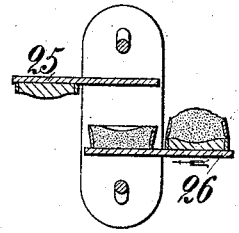
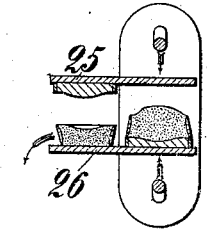
Fig. 17.   Fig. 18.
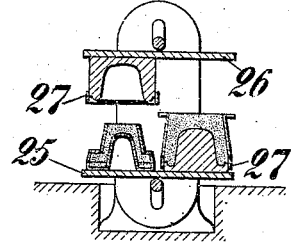
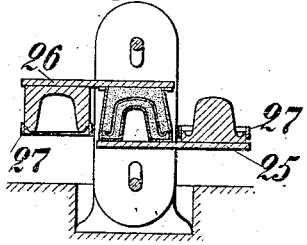
Witnesses
W. R. Schulz
August Miner
Inventor,
Gustav Adolf Oertzen
by his attorney

UNITED STATES PATENT OFFICE.

GUSTAV ADOLF OERTZEN, OF DUSSELDORF-OBERCASSEL, GERMANY.

MOLDING-MACHINE.

No. 906,268.  Specification of Letters Patent.  Patented Dec. 8, 1908.

Application filed June 4, 1908. Serial No. 436,645.

*To all whom it may concern:*

Be it known that I, GUSTAV ADOLF OERTZEN, a citizen of Germany, residing at Dusseldorf-Obercassel, Germany, have invented new and useful Improvements in Molding-Machines, of which the following is a specification.

This invention relates to a molding machine with rotary frame and two molding or pattern plates which are movable in the frame and are moved towards each other by means of cranks or the like.

A chief characteristic of the invention is that each of the two molding or pattern plates which are situated opposite one another in the frame is extended in the direction of its length so as to form a part which is without pattern and serves as a pressing plate and when moved apart and adjusted they enable the molding box to be put on, filled and removed, and when the particular parts are placed exactly one over the other, enable the pressing to be effected and if necessary of each half of the molding box.

A further characteristic is that by a single rotation of a driving wheel or the like the frame is rotated to the extent of 180° and automatically fixed and then, with continuous rotation, the pressing cranks are actuated and the pressing is effected. One molding box as shown or a number of molding boxes may be arranged at the same time adjacently and be pressed.

Figure 1:
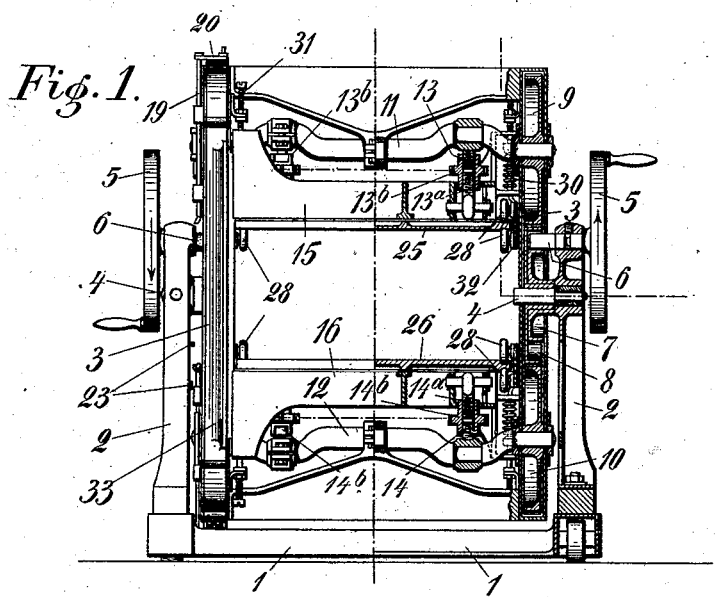
Figure 2:
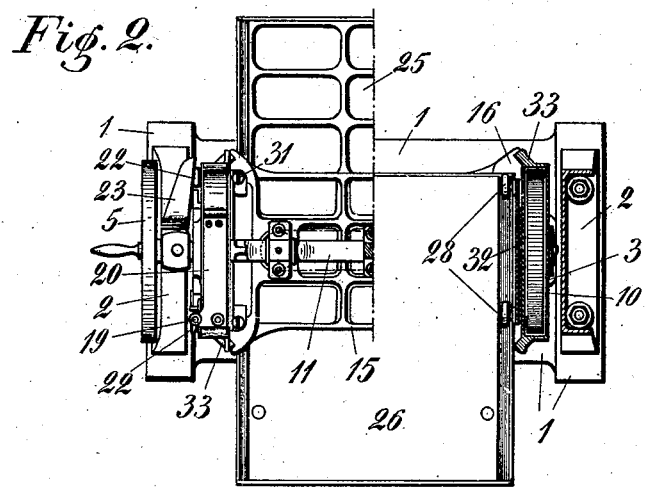
Figure 3:
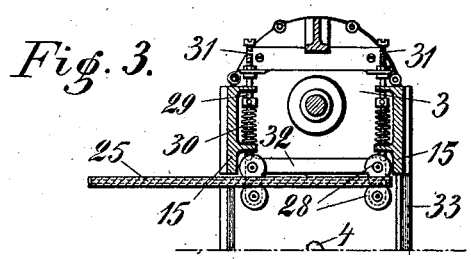

In Figures 1 to 18 of the accompanying drawings the machine is illustrated as a whole, in detail and in the different stages of working. Fig. 1 is a front elevation and partial vertical section, Fig. 2 a plan and partial transverse section, Fig. 3 a portion of a longitudinal section, Fig. 4 a side elevation, Fig. 5 a portion of a transverse section, Figs. 6 and 7 represent a longitudinal section of a portion of the machine specially illustrating a pawl mechanism in different positions. Figs. 8 to 18 illustrate the plates with the molds in the different working positions in relation to one another.

The frame of the machine is supported by two standards 2 joined together by a base member 1, and in the form of the invention illustrated the frame 3 of the machine is mounted to rotate on pivots 4. In the standards 2 the disks 5 furnished with hand cranks are rotatively mounted. On the shafts of these disks are spindles 6 by which the wheels 7 mounted on the pivots of the frame 3 are actuated, the wheels 7 being connected with the larger wheels 8 mounted on the same shaft. In the construction shown the toothed rim of the smaller wheel 7 is encircled by that of larger wheel 8, the hub of the latter carrying the hub of wheel 7. The wheels 8 engage with the wheels 9 and 10 which are mounted on the journals of the upper and lower bent crank shafts 11 and 12. The crank shafts are connected on both sides through the rods 13 and 14 with the appurtenant upper and lower pressing beams 15 and 16 against which the pattern or molding plates 25 and 26 are held so as to be horizontally adjustable. The wheels 9 and 10 engage in such a manner with the wheels 8 that the pressing beams actuated by the crank shafts 11 and 12 are simultaneously moved towards or away from each other. The rods 13 and 14 are adjustable so that the pressing beams which are moved against supports 33 of the rotary frame, can be adjusted according to the height of the molding box. In the form of the invention illustrated these rods consist of the screw threaded parts 13, $13^a$ and 14, $14^a$ with nuts $13^b$ or $14^b$ by means of which the parts can be drawn together or extended. Each of the two nuts $13^b$ or $14^b$ can be connected with one another by a chain or in some other manner, so that they can be always moved together and uniformly. Instead of two rods 13, 14 a larger number can of course be used. The molding plates 25 and 26 are arranged between rollers 28, so that they can be easily adjusted. The roller bearings 32 are mounted on rods 29 Fig. 3 on which springs 30 act so that the plates 25, 26 are always firmly pressed against the pressing beams 15, 16 and cannot shift automatically. In order however that the adjustment of the plates 25, 26, may be easily effected, when the pressing beams are moved apart, adjustable stops 31 are provided in the paths of the rods 29 and when the pressing beams are moved apart act on the rods to relieve the pressure of the roller bearings 32 on the pressing beams.

If the frame 3 is stationary, when the spindles 6 are rotated the wheels 9 and 10 are rotated as also the crank shafts through the wheels 8. If on the other hand the frame can rotate and the wheels 9 and 10 are locked thereto when the wheels 8 rotate through the medium of the spindles 6 the frame 3 is rotated with the wheels 9 and 10 as well as with the crank shafts and pressing plates, without the crank shafts however rotating in the frame bearings. The locking of the frame with the wheels may be effected in any manner as preferred. In the form of the invention as illustrated pawls 17 are employed which when the wheels 9 and 10 are rotated to a sufficient extent, drop into their recesses 18 which come below them. Thereby a firm connection of the wheels with the frame is obtained. The pawls 17 are situated on rods 19 which are adjustable and rotative on the frame and are under the influence of springs 20 and 21. The rods are provided with projections 22, which come against projections or tappets 23 when the frame has been rotated to a suitable extent, whereby the pawls are removed from the recesses. As the rods which carry the pawls, are as already mentioned adjustable and as the springs 20 have the tendency to move them, the movement takes place directly the pawls come out of the recesses. Consequently the rotation of the wheels 9 and 10 and of the pressing beams can be effected when the frame is held. The stopping of the frame is effected each time directly after the release of the wheels 9 and 10, by a downwardly directed rod 19 influenced by a spring 20 and engaging with a rest 24 on the base member 1 of the machine. The engaging and disengaging devices are so placed that in each of the two end positions of the frame which vary to the extent of 180° and in which it is retained by the rod 19 and rest 24 until the then released wheels have been once rotated, the two stamps move apart, and then come together again and effect the pressing. Thus in each end position of the frame an upper molding box part and a lower molding box part can always be completed alternately. The manner in which the molding plates 25, 26 are adjusted for the purpose of putting on the parts of the molding box and filling the latter and for pressing the molding sand is illustrated in Figs. 8 to 18.

At the beginning of the molding operation, as will be seen for example from Fig. 8, a molding box is placed on the forward drawn molding plate with the model for the upper mold and filled with molding sand, while the other molding plate with the model for the lower part of the mold is pushed to the left. Hereupon the molding plate 26 is pushed into the machine between the pressing beams (see the position indicated by dotted lines in Fig. 8) which with the molding plates carried by them are brought near together and press the upper mold (Fig. 9). The frame is then given a half turn and thus also the molding plates (Fig. 10) whereupon the pressing beams with the molding plates are moved apart again, so that the molding plate 26 is removed from the molding box. The molding plate is then pushed to the left and a molding box put on to the molding plate 25 with the model for the lower mold and filled with molding sand (Fig. 11). The molding plate 25 is likewise pushed to the left and the finished upper mold removed (Fig. 12). Then the pressing of the lower mold is effected (Fig. 13) and hereupon the frame and the molding plates (Fig. 14) are again rotated. The pressing beams with the molding plates are then moved apart again and the molding plate 25 which is thereby removed from the molding box is pushed to the left, a new molding box being then placed on the molding plate 26 for the upper mold and filled with molding sand (Fig. 15). Hereupon the plate 26 is again pushed to the left and the lower mold the pressing of which is completed is removed (Fig. 16). The upper mold is again pressed and the molding operation proceeds in the same manner as before (from Fig. 9 onwards).

Figs. 17 and 18 illustrate an arrangement according to which the molding plates are likewise adjustable, but the frame is stationary. The arrangement is especially suitable for molding deeper objects, as, for example, bathing tubs, boilers, and the like. Under this arrangement it is not necessary to actuate two pressing beams simultaneously but the pressure may be effected from above or from below only. As will be seen from the figures the molding of the upper and of the lower molding box parts is always effected simultaneously. In the working stage illustrated in Fig. 17 the model for the upper molding box part is on the lower movable plate 25, on the one the right side, and the lower parts of the molding box on the other the left side. On the lower molding box part a filling templet is put. When this has been filled with molding sand the same as the upper molding box part, as illustrated, it is removed. On the upper adjustable plate 26 the model for the lower part is fixed and on this moreover pins with wedge slots are arranged which retain the upper box after the pressing and thereby remove it from the model. As both molding plates are provided with removable frames 27, when the mold is pressed they come at first on to or below the molding box, so that an escape of the sand is impossible. When both halves of the mold are simultaneously pressed, the frames are pushed back until the edge of the molding box lies in the same plane as the molding plate. When the pressing beams have been moved back both plates are pushed towards the middle so that the upper molding box part is above the lower molding box part (see Fig. 18). The two parts of the box are then put together by moving the pressing beams and the molding plates towards one another.

Hereupon the connection between the upper mold and the plate 26 is again broken and the plates are again moved apart. The plates are now pushed in opposite directions and the completed molding box can be lowered by means of a crane. Thus in this manner the machine can work without turning.

I claim:

1. A molding machine comprising a pair of opposed molding plates, each plate being provided with a pattern-section and with an adjoining smooth section, means for laterally displacing the plates, and means for altering the distance between said plates, substantially as specified.

2. A molding machine comprising a pair of opposed molding plates, each plate being provided with a pattern-section and with an adjoining smooth section, means for laterally displacing the plates, and means for uniformly moving both plates towards and away from each other, substantially as specified.

3. A molding machine comprising a rotatable frame, a pair of pressing beams slidably mounted therein, a pair of molding plates carried by the pressing beams, each plate being provided with a pattern-section and with an adjoining smooth section, means for reciprocating the beams, and means for laterally displacing the plates on the beams, substantially as specified.

4. A molding machine comprising a pair of standards, a frame rotatably mounted therein, a pair of pressing beams slidably mounted in the frame, molding plates slidably connected to said beams, means for laterally displacing the plates on the pressing beams, means for reciprocating the pressing beams, and means for rotating the frame, substantially as specified.

Signed by me at Dusseldorf, Germany, this sixteenth day of May, 1908.

GUSTAV ADOLF OERTZEN.

Witnesses:
PETER LIEBER,
WILHELM FLASCHE.